(12) United States Patent
Massoulie et al.

(10) Patent No.: US 8,706,831 B2
(45) Date of Patent: Apr. 22, 2014

(54) DEVICE AND METHOD FOR CONTROLLING DISSEMINATION OF CONTENTS BETWEEN PEERS HAVING WIRELESS COMMUNICATION CAPACITIES, DEPENDING ON VOTE VECTORS

(75) Inventors: Laurent Massoulie, Vaucresson (FR); Efstratios Ioannidis, San Francisco, CA (US); Augustin Chaintreau, Paris (FR)

(73) Assignee: Thomson Licensing (FR)

( * ) Notice: Subject to any disclaimer, the term of this patent is extended or adjusted under 35 U.S.C. 154(b) by 243 days.

(21) Appl. No.: 12/931,295

(22) Filed: Jan. 28, 2011

(65) Prior Publication Data

US 2011/0185031 A1 Jul. 28, 2011

(30) Foreign Application Priority Data

Jan. 28, 2010 (EP) .................................... 10290041
Mar. 31, 2010 (EP) .................................... 10305334

(51) Int. Cl.
*H04L 29/06* (2006.01)
*H04L 29/08* (2006.01)
*H04L 12/56* (2006.01)

(52) U.S. Cl.
CPC .......... *H04L 29/08549* (2013.01); *H04L 29/06* (2013.01); *H04L 49/90* (2013.01)
USPC ............................... 709/212; 709/204; 710/20

(58) Field of Classification Search
CPC .... H04L 29/08549; H04L 29/06; H04L 49/90
USPC .................... 709/212, 204; 710/20
See application file for complete search history.

(56) References Cited

U.S. PATENT DOCUMENTS

| 7,636,325 | B2* | 12/2009 | Basu et al. ..................... 370/254 |
| 2008/0196099 | A1* | 8/2008 | Shastri ............................. 726/12 |
| 2009/0037211 | A1* | 2/2009 | McGill et al. ..................... 705/1 |
| 2009/0168795 | A1* | 7/2009 | Segel ............................. 370/429 |
| 2010/0229222 | A1* | 9/2010 | Li et al. ............................. 726/5 |
| 2012/0088450 | A9* | 4/2012 | Laroia et al. ................. 455/41.2 |
| 2012/0221647 | A1* | 8/2012 | Ciminiera et al. ............ 709/204 |

FOREIGN PATENT DOCUMENTS

| EP | 1599013 | 11/2005 |
| WO | WO2007131525 | 11/2007 |

OTHER PUBLICATIONS

Search Rept. Oct. 7, 2010.

* cited by examiner

*Primary Examiner* — Abdullah Riyami
*Assistant Examiner* — Brian Cox
(74) *Attorney, Agent, or Firm* — Jack Schwartz and Associates, PLLC

(57) ABSTRACT

A method is intended for controlling dissemination of content in a peer-to-peer mode between peers having wireless communication capacities and comprising a cache memory for storing contents. This method consists, each time a peer, having a group of variable values each associated to a content it can store into its cache memory and representative of utility that storing of this content represents for it and for other peers, accesses to a wireless network or to another peer offering access to these contents, in downloading N contents having the N highest variable values into its group, N being a number depending on the storage capacity the peer is ready to use into its cache memory to store contents to be downloaded.

10 Claims, 1 Drawing Sheet

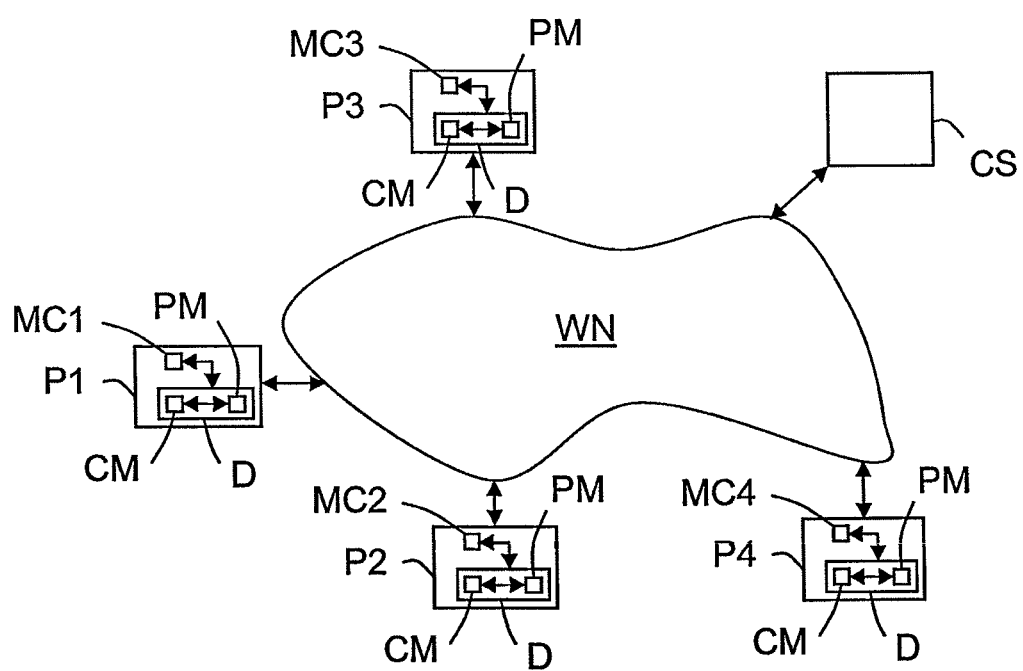

U.S. 8,706,831 B2

DEVICE AND METHOD FOR CONTROLLING DISSEMINATION OF CONTENTS BETWEEN PEERS HAVING WIRELESS COMMUNICATION CAPACITIES, DEPENDING ON VOTE VECTORS

This application claims the benefit, under 35 U.S.C. §119 of European Patent Application No. 10290041.2, filed Jan. 28, 2010 and European Patent Application No. 10305334.4, filed Mar. 31, 2010.

TECHNICAL FIELD

The present invention relates to content dissemination between peers in a peer-to-peer (or "P2P") wireless environment.

One means here by "peer" a wireless communication equipment capable of exchanging data (or symbols (i.e. blocks or packets or chunks of data)) with other peers or network equipments in a P2P mode through wireless communications. So, a peer may be a laptop, a smartphone, a mobile or cellular telephone, a personal digital assistant (PDA), provided that it comprises a wireless communication interface (or any equivalent wireless communication means), or a node associated to a vehicle (for instance a bus or a car) or a base station that is assisting opportunistic content delivery in an area (such as a content "booth" (or a "throwbox")).

Moreover, one means here by "content dissemination" the transmission of content data between peers in order each of these peers had these content data at its disposal or at the disposal of other peers.

More, one means here by "content" any type of set of data that can be disseminated in a P2P mode, and notably files of information data, videos, chunks of video, pictures to share, html files, audio files and software updates, and more generally any type of file, hereafter called "item".

BACKGROUND OF THE INVENTION

As it is known by the man skilled in the art, in a fixed P2P environment (or network), communication equipments (or peers) meet according to a simple homogeneous and memoryless process, as if they follow uncoordinated mobility, and have a dedicated buffer (or cache memory) which can be filled with content items (or files) that could be requested later by other peers. The demands (or requests) for different content items arise according to a stationary regime that can follow an arbitrary popularity distribution.

In contrast with traditional wired P2P networks, in wireless P2P networks contents are shared through opportunistic contacts. Peers store, in a local cache memory, contents they download when they are connected to a wireless network, and share them with other users when they meet them in an opportunistic manner, for instance within short range radio transmission (e.g. Bluetooth or IEEE 802.11). The storage capacity of wireless peers being limited, identifying which content a peer should store in its local cache memory in its interest but also in the interest of the other peers is an important problem.

For instance, solutions have been proposed to take into consideration the fact that sharing allows peers to access to content even when they are not within the infrastructure's coverage but also can assist the distribution of content and reduce the overall load on the infrastructure by utilizing the bandwidth available during opportunistic contacts. These solutions extend the reach of the dedicated service infrastructure while also improving its scalability. As such, they are efficient for the distribution of contents when access to the infrastructure is intermittent as well as when the downlink bandwidth available for content distribution is limited. But these solutions have an important drawback which is the delay. Indeed a peer can retrieve a content only when it has access to the infrastructure or when it encounters another peer storing it. So, the content shared should be delay-tolerant, in the sense that prompt delivery is not a strict requirement.

Given that mobile devices have limited storage capacity, an important challenge in the content sharing systems is determination of peer's caching policies which characterize the contents they should retrieve and store when accessing the infrastructure. In general, peers should store content that is likely to be of use either to themselves or to other peers they encounter. From a system-wide perspective, a natural goal when selecting such policies is to minimize delay: the contents stored at different peers should be chosen so that the average delay for retrieving requested contents is minimized, for instance.

Addressing this problem in the context of a wireless infrastructure is challenging for several reasons. The most important reason is heterogeneity. Indeed, wireless infrastructure resources may vary across peers, and therefore peers may have different storage capacities and may access the infrastructure at different rates. Moreover, peers may not value content in the same way, and therefore they may not necessarily be interested in the same contents, and might be more or less sensitive to finding them quickly. More, peers might follow diverse mobility patterns, and therefore they may have different opportunities to share their cached contents and to retrieve contents from other peers. These three sources of heterogeneity (access to resources, user preferences and mobility) play an important role in determining what contents a peer should store. Heterogeneity implies that caching policies intended for minimizing delays may vary considerably among peers.

An additional challenge arises from the fact that at least two of the above parameters, namely user preferences and mobility, may not be a priori known. In this sense, any mechanism for determining a peers caching policy cannot readily access this information.

Another challenge introduced by determination of caching policies is the need for decentralization. Indeed, as important parameters are not a priori known, determining caching policies in a centralized manner requires collecting data from users, such as mobility or content access traces, and such a data collection may not scale. Moreover, as in wired peer-to-peer infrastructures, wireless peers may wish to cooperate and share downloaded content in the absence of any central authority, due to security, "single point of failure" or privacy concerns, for instance.

SUMMARY OF THE INVENTION

So the object of this invention is to overcome at least partly the above mentioned drawbacks and/or challenges. More precisely the invention aims at providing a method and an associated control device allowing for disseminating contents between wireless peers in an environment in which the three above mentioned sources of heterogeneity (access to resources, user preferences and mobility) may occur, and in the absence of a central authority (and therefore in a fully distributed manner).

Still more precisely, the invention provides a method, intended for controlling dissemination of contents in a peer-to-peer mode between peers having wireless communication capacities and comprising a cache memory for storing contents, and consisting, each time a peer, having a group of variable values each associated to a content it can store into its cache memory and representative of utility that storing of this content represents for it and for other peers, accesses to a wireless network or another peer offering access to the contents, in downloading M contents having the M highest variable values into its group. M is a number which depends on the storage capacity the considered peer is ready to use into its cache memory to store contents to be downloaded.

The method according to the invention may include additional characteristics considered separately or combined, and notably:

each peer may determine its own group of variable values from reports it has generated and reports received from other peers, each report indicating the effect that storing a content in a peer has on the utility of this peer;

each peer may update its own group of variable values each time it generates a new report and each time it receives a new report from an other peer it encounters;

a peer may define a first list comprising at least one site or (content) item from which it does not want to download any content and/or a second list comprising at least one site or (content) item from which it wants to download contents to store them permanently. In this case, the storage capacity to be used into the cache memory of a peer is equal to the difference between the maximal storage capacity of this cache memory and the storage capacity of this cache memory that can be used for storing contents downloaded from the sites or items of the second list;

when a peer accesses a wireless network or encounters an other peer, it may download the most recent versions of at least some contents that are already stored into its cache memory.

The invention also provides a control device, intended for controlling dissemination of contents in a peer-to-peer mode from an associated peer (having a cache memory for storing contents) to other peers through wireless communications, and comprising a control means arranged, each time its peer accesses to a wireless network or another peer offering access to contents and has a group of variable values that are each associated to a content it can store into its cache memory and representative of utility that storing of this content represents for it and for other peers, in authorizing this peer to download M contents having the M highest variable values into its group. M is a number which depends on the storage capacity the considered peer is ready to use into its cache memory to store contents to be downloaded.

The control device according to the invention may include additional characteristics considered separately or combined, and notably:

it may comprise a processing means arranged for generating reports indicating the effect that storing a content into its associated peer has on the utility of this peer, and for determining the variable values of the group of its associated peer from reports it has generated and from reports received from other peers;

the processing means may be arranged for updating the group of variable values of its associated peer each time it generates a new report and each time its associated peer receives a new report from an other peer it encounters;

its control means may be arranged for storing a first list comprising at least one site or (content) item from which its associated peer does not want to download any content and/or a second list comprising at least one site or (content) item from which its associated peer wants to download contents to store them permanently, and for determining the storage capacity that can be used into the cache memory of its associated peer by computing the difference between the maximal storage capacity of this cache memory and the storage capacity of this cache memory that can be used for storing contents downloaded from the sites or items of the second list;

its control means may be arranged, when its associated peer accesses to a wireless network or encounters an other peer, to authorize it to download the most recent versions of at least some contents that are already stored into its cache memory.

The invention also provides a peer (or wireless communication equipment) capable of establishing connection(s) with other peers through wireless communications, and comprising a cache memory and a control device such as the one above introduced.

BRIEF DESCRIPTION OF THE FIGURE

Other features and advantages of the invention will become apparent on examining the detailed specifications and the appended drawing, wherein the unique FIGURE schematically and functionally illustrates four wireless communication equipments (or peers) connected to a wireless communication network and each comprising an example of embodiment of a control device according to the invention.

DETAILED DESCRIPTION OF THE PREFERRED EMBODIMENT

The appended drawing may serve not only to complete the invention, but also to contribute to its definition, if need be.

The invention aims at offering a method and an associated control device D allowing to control P2P dissemination of contents between peers Pj of a group that may be temporarily connected to a wireless communication network WN offering access to contents and that may be also temporarily connected therebetween through wireless communications to share contents in a peer-to-peer mode.

In the illustrated and non limiting example the group of peers Pj comprises four peers P1 to P4 (j=1 to 4). But the invention concerns any group comprising at least two peers capable of exchanging content data therebetween.

In a general manner, a group of peers Pj comprises N peers P1 to PN (j=1 to N), and may be partitioned in L distinct classes $C_1, C_2, \ldots, C_L$. The size of each class $C_i$ may be $C_{ij}$. One assumes that the peer population in each class $C_i$ grows proportionally to N, i.e., for all i, $|C_i|=r_iN$, where $r_i$ is a constant (in N). Moreover, one may assume that peers Pj in the same class Ci are statistically identical. So one considers that peers Pj in the same class Ci have the same contact characteristics and storage capacities, they exhibit the same demand for content and accrue the same utility from locating certain contents. Nonetheless, one assumes that peers Pj are oblivious to the existence of these classes, i.e., a peer does not know to which class $C_i$ it belongs and cannot distinguish other peers Pj' based on their respective classes. For this reason, decisions made by the method (e.g., on what to store in a peer's cache memory CMj) will not depend on a priori knowledge of classes.

In the following description it will be considered that the wireless communication network WN is an IEEE 802.11 network (i.e. a WLAN (Wireless Local Area Network), for instance of the WiFi type) and that the wireless communications between peers Pj are also established via this wireless communication network WN. But the invention is not limited to this example of wireless infrastructure. Indeed, the wireless communication network WN may be also a mobile or cellular network, a Zygbee network, an Ultra Wide band network, or an IEEE 802.15 network, for instance, and the wireless communications between peers Pj may be established through a wireless network which is different from the wireless communication network WN, such as a Bluetooth network, for instance.

Moreover, in the following description it will be considered that peers Pj are mobile telephones. But the invention is not limited to this type of wireless communication equipment. Indeed, the invention concerns any type of wireless communication equipment comprising at least one executable P2P communication application and capable of exchanging data (or symbols) with other wireless communication equipments or network equipments in a P2P mode through wireless communications. So, a peer may be also a laptop, a smartphone, a personal digital assistant (PDA), provided that it comprises a wireless communication interface (or any equivalent wireless communication means), or a node associated to a vehicle (for instance a bus or a car) or a base station that is assisting opportunistic content delivery in an area (such as a content "booth" (or a "throwbox")).

More, in the following description it will be considered that the contents to be disseminated are videos. But the invention is not limited to this type of content. Indeed, the invention concerns any type of content which can be disseminated in a P2P mode, and notably files of information data, chunks of video, pictures to share, html files, audio files and software updates, RSS ("Really Simple Syndication") feeds, and more generally any type of file.

As illustrated in the unique FIGURE, contents may be downloaded by the peers Pj from at least one content server CS which is connected to, or accessible through, the (wireless communication) network WN.

As mentioned before the invention offers notably a method intended for controlling dissemination of content (and more precisely of content items) in a peer-to-peer (P2P) mode between peers Pj.

It is important to note that each peer Pj comprises a cache memory (or buffer) MCj in which it stores content items received from other peers Pj' (j'≠j) when it encounters them, or from the content server CS when it accesses to the network WN.

Moreover, when a peer Pj wants to obtain a content item, it generates a dedicated request or demand containing an identifier of this requested content item and transmits this dedicated request to each peer Pj' (j'≠j), eventually selected, it encounters.

One may assume that contacts (or meetings) between peers Pj and Pj' occur in continuous time and follow the statistics of a Poisson process with rates $\lambda_{j,j'}$ which are constants that do not depend on N. One further assumes that, when a peer Pj encounters another peer Pj' belonging to a class $C_{i'}$, this peer Pj' is selected uniformly at random from $C_{i'}$. Hence, any given peer Pj meets and shares content with only a constant number of other peers Pj' per second. This is important, as peers Pj typically have limited bandwidth.

One may also assume that contacts between peers Pj and Pj' are symmetric (Pj contacts Pj' whenever Pj' contacts Pj). As a result, $ri\lambda_{j,j'}=ri\lambda_{j',j}$. To understand this assumption, one may observe that a given peer Pj of $C_i$ meets a given peer Pj' of $C_{i'}$ with a rate $ri\lambda_{j,j'}/|C_{i'}|$, and the latter should equal the rate with which Pj' meets Pj. Moreover, one assumes that each peer Pj of $C_i$ accesses the infrastructure according to a Poisson process with rate $\mu_i>0$, also constant in N. An access event indicates, e.g., that the peer is within the vicinity of its home or its office and can access the Internet through a wireless connection. Note that this requires $\mu_i$ to be strictly positive; every peer accesses the infrastructure, eventually.

The method, according to the invention, can be implemented by control devices D according to the invention which are respectively associated to peers Pj, i.e., which are each dedicated to the control of content dissemination of one associated peer Pj.

As it is schematically illustrated in the unique FIGURE, each (control) device D may be located into its associated peer Pj. But each device D could be also an equipment or element coupled to its associated peer Pj.

So, a device D can be made of software modules, at least partly, or of electronic circuit(s) or hardware modules, or else of a combination of hardware and software modules (in this case the device D comprises also a software interface allowing interworking between the hardware and software modules).

The method according to the invention is implemented by a device D associated to a peer Pj each time this peer Pj accesses to the network WN or to another peer Pj' and possesses a group of variable values that are each associated to a content it can store into its cache memory MCj and representative of utility that storing of this content represents for it (Pj) and for other peers Pj' it has encountered.

The variable may be named "vote", for instance.

This method consists, each time such a peer Pj accesses to the network WN or to another peer Pj' in downloading M contents having the M highest variable values into its group of variable values. M is a number which depends on the storage capacity that a peer Pj is ready to use into its cache memory MCj to store contents to be downloaded. In the following description this downloading according the invention will be named "reshuffling".

In fact, each time a peer Pj accesses to the network WN or to another peer Pj', a control means CM of its (associated) device D analyzes its group of vote values to determine its M highest vote values and then the M contents to which they respectively correspond, and then authorizes its peer Pj to download these M contents.

One may assume that a peer Pj does not reshuffle content at all encounters with the network WN (though it always refreshes this content). Instead, one may assume that it reshuffles content with some probability $\alpha=\alpha(N)>0$ that one allows to be a function of the number M of peers Pj.

One refers hereafter to $v_{Pj,w}(t)$ to designate the vote (or variable) value of content w at peer Pj and at time t, and to $\vec{v}_{Pj}(t)=\lfloor v_{Pj,w}(t)\rfloor$ as the group of vote values of peer Pj, hereafter named vote vector.

Each peer Pj may determine its own group of vote values from reports it has transmitted to other encountered peers Pj' and reports it has received from other peers Pj'. This is more precisely a processing means PM of its device D that is in charge of this group determination, and which generates the reports to be transmitted to the other encountered peers Pj'.

One means here by "report" information data that indicate the effect that storing a content in a peer Pj has on the utility of this peer Pj. One considers that peers Pj of class $C_i$ have utilities $U_{i,w}$ that are functions of the time required to find a content w. These utilities capture the "impatience" of a peer Pj, i.e., how sensitive it is to get a given content w quickly. One may assumes that for all i and w, utilities $U_{i,w}$ are non-increasing, differentiable and $|U_{i,w}|=o\,(e^{ct})$, for all $c>0$.

The assumption that utilities $U_{i,w}$ are non-increasing is natural because the longer a peer Pj has to wait for getting a content w, the lower the utility it would obtain from finding this content w. Moreover, a sharp decrease indicates that peer Pj is very impatient, and receives little utility from a content w retrieved with a high delay.

A peer Pj may define a first list comprising at least one (web)site or item (for instance video) from which it does not want to download any content and/or a second list comprising at least one (web)site or item (for instance video) from which it wants to download contents to store them permanently. So the first list contains blacklisted contents (or items) or websites, while the second list contains preferred contents (or items) or websites. These first and second lists are stored by the processing means PM into a local memory (for instance of the software type) that it contains or that is contained by its peer Pj. In this case, the M contents having the M highest vote values into a peer group cannot belong to the first list and cannot be downloaded from another encountered peer Pj'.

The processing means PM is arranged for determining the storage capacity that can be used into the cache memory MCj of its associated peer Pj by computing the difference between the maximal storage capacity of this cache memory MCj and the storage capacity of this cache memory MCj that can be used for storing contents downloaded from the sites of the second list. This results from the fact that contents belonging to the second list are permanently stored into a cache memory MCj and therefore cannot be replaced with an other content without authorization of the user of the peer Pj.

The vote vector of a peer Pj can be seen as an exponentially weighted moving average (or EWMA) which is, as mentioned before, constructed by means of reports generated by its device D as well as reports it receives from other peers Pj' it encounters.

To understand the preceding sentence, one first needs to make the following definitions. For every content w, a peer Pj keeps track of the number of time slots between its last two consecutive encounters with another peer Pj' that stores content w or with the network WN. One denotes this quantity (i.e. number of time slots) at time t by $T_{Pj,w}(t) \geq 0$. A peer Pj also maintains a buffer of all pending requests: let $n_{Pj,w}(t)$ be the number of pending requests for content w that peer Pj has at time t. For every content w stored in the cache memory MCj of peer Pj, $n_{Pj,w}(t)=0$.

$T_{Pj,w}(t)$ and $n_{Pj,w}(t)$ need only to be maintained for contents w for which Pj is interested in (i.e., $d_{i,w}>0$, where $d_{i,w}$ is the request rate of content w by peer Pj of class $C_i$). In practice, a peer Pj may keep track of these values only if it has issued a request for content w at some date in the past.

Whenever peer Pj meets another peer Pj', it reports to the latter (Pj') the following quantity for every content w: $rep_{Pj,w}(t)=-T_{Pj,w}(t)*U'_{i,w}(T_{Pj,w}(t))*n_{Pj,w}(t)$, where $U'_{i,w}$ is the derivative of utility $U_{i,w}$. This quantity $rep_{Pj,w}(t)$ serves as a report capturing the effect that content w has on the utility of peer Pj. It is important to note that if peer Pj meets a peer Pj' that stores content w, peer Pj first reports $rep_{Pj,w}(t)$ and then updates the values $T_{Pj,w}(t)$ and $n_{Pj,w}(t)$ accordingly (for instance by updating $T_{Pj,w}(t)$ and setting $n_{Pj,w}(t)$ to zero). Moreover, in practice $rep_{Pj,w}(t)$ needs only to be reported for all contents w for which there are pending requests, i.e., $n_{Pj,w}(t)>0$. For all other contents w, $rep_{Pj,w}(t)$ is equal to zero and does not need to be reported.

A processing means PM may update the group of vote values of its peer Pj each time it generates a new report for an other peer Pj' it encounters and each time its peer Pj receives a new report from another peer Pj' it encounters.

For peer Pj of class $C_i$, the average vote value $v_{Pj,w}(t)$ can be updated in the following way. Between requests or encounters with other peers Pj', $v_{Pj,w}(t)$ decays exponentially with a rate $\beta=\beta(N)>0$, a positive gain factor which one allows to depend on N. Whenever peer Pj receives a report, $v_{Pj,w}(t)$ is incremented by the value in this report (i.e. $rep_{Pj',w}(t)$ is added to $v_{Pj,w}(t)$). Moreover, whenever peer Pj generates a request, $v_{Pj,w}(t)$ is incremented by $U_{i,w}(0)-U_{i,w}(T_{Pj,w}(t))$.

More formally, for small $\delta>0$, $v_{Pj,w}(t+\delta)=(1-\beta(N)\delta)v_{Pj,w}(t)+\beta(N)g_{Pj,w}(t,t+\delta)$, where, with probability $1-O(\delta^2)$, $$g_{Pj,w}(t, t+\delta) = \begin{cases} rep_{Pj',w}(t), & \text{if } Pj, Pj' \text{ meet in } (t, t+\delta] \\ U_{i,w}(0) - U_{i,w}(T_{Pj,w}(t)), & \text{if } Pj \text{ requests content } w \text{ in } (t, t+\delta] \\ 0, & \text{otherwhile.} \end{cases}$$

Because of the exponential decay between increments $v_{Pj,w}(t)$ is called an EWMA. The gain factor $\beta(N)$ allows to make the process more or less sensitive to newer reports, and then to control the variability of $v_{Pj,w}(t)$.

When a peer Pj accesses to the network WN or encounters another peer Pj', it may be also authorized by its processing means PM to download the most recent versions of at least some contents that are already stored into its cache memory MCj, in order to refresh it (MCj).

It can be demonstrated that the caching policies (or cache contents) of the peers Pj, computed by the method according to the invention, are optimal in terms of average utility per peer (or social welfare) maximization. Moreover it optimizes the use of storage capacity rather than bandwidth. It is recalled that the "caching policies" are basically the contents that are stored into the caches. The vote vector determines the cache contents in the manner described above (i.e. whenever a peer Pj accesses the network WN (or another peer Pj'), it downloads the M items with the highest votes).

The invention is not limited to the embodiments of method, control device and peer (or wireless communication equipment) described above, only as examples, but it encompasses all alternative embodiments which may be considered by one skilled in the art within the scope of the claims hereafter.

The invention claimed is:

1. Method for controlling dissemination of contents in a peer-to-peer mode between mobile peers having wireless communication capacities and comprising a cache memory for storing contents, wherein, each time a peer, having a group of variable values each associated to a content a peer can store into its cache memory and representative of utility that storing of this content represents for the peer and for other peers, said utility being a function of the time required to find said content, accesses to a wireless network or another peer offering access to said contents, in downloading N contents having the N highest variable values into the group of variable values for the peer, N being a number depending on the storage capacity said peer is ready to use into its cache memory to store contents to be downloaded, wherein each peer determines, by using an averaging process, its own group of variable values from reports generated by the peer and reports received from other peers, each report indicating the effect that storing a content in a peer has on the utility of said peer.

2. Method according to claim 1, wherein the averaging process implements an Exponentially Weighted Mean Average, EWMA.

3. Method according to claim 1, wherein each peer updates its own group of variable values each time the peer generates a new report and each time the peer receives a new report from another peer the peer encounters.

4. Method according to claim 1, wherein a peer defines a first list comprising at least one site or item from which the peer does not want to download any content and a second list comprising at least one site or item from which the peer wants to download contents to store them permanently, the storage capacity to be used into a cache memory of the peer being equal to a difference between a maximal storage capacity of the cache memory of the peer and the storage capacity of the cache memory of the peer that can be used for storing contents downloaded from the sites or items of the second list.

5. Method according to claim 1, wherein when a peer accesses to a wireless network or encounters another peer, the peer downloads the most recent versions of at least some contents that are already stored into its cache memory.

6. Control device for controlling dissemination of contents in a peer-to-peer mode from an associated peer to other peers through mobile wireless communications, each peer having a cache memory for storing contents, wherein said control device comprises a control module arranged, each time said associated peer accesses to a wireless network or another peer offering access to contents and has a group of variable values each associated to a content that said associated peer can store into its cache memory and representative of a utility that storing of this content represents for said associated peer and for other peers, said utility being a function of the time required to find said content, for authorizing said associated peer to download N contents having the N highest variable values into said group of variable values, N being a number depending on the storage capacity said associated peer is ready to use into its cache memory to store contents to be downloaded, wherein said control device comprises a processing module arranged for generating reports indicating the effect that storing a content into its associated peer has on the utility of said peer, and for determining, by using an averaging process, said variable values of the group of its associated peer from reports it has generated and from reports received from other peers.

7. Control device according to claim 6, wherein said processing module is arranged for updating the group of variable values of its associated peer each time the processing module generates a new report and each time said associated peer receives a new report from another peer it encounters.

8. Control device according to claim 6, wherein said control module is arranged for storing a first list comprising at least one site or item from which its associated peer does not want to download any content and a second list comprising at least one site or item from which its associated peer wants to download contents to store them permanently, and for determining the storage capacity that can be used into the cache memory of its associated peer by computing the difference between the maximal storage capacity of said cache memory and the storage capacity of said cache memory that can be used for storing contents downloaded from the sites or items of the second list.

9. Control device according to claim 6, wherein said control module is arranged, when its associated peer accesses a wireless network or encounters another peer, to authorize it to download the most recent versions of at least some contents that are already stored into its cache memory.

10. Peer capable of establishing wireless communications with other peers and comprising a cache memory for storing contents, wherein it further comprises a control device according to claim 6.

* * * * *